Sept. 7, 1965 L. G. VON LOSSBERG 3,205,045
APPARATUS FOR CONTINUOUS MEASUREMENT OF ORGANIC MATTER IN WATER
Filed Sept. 6, 1962
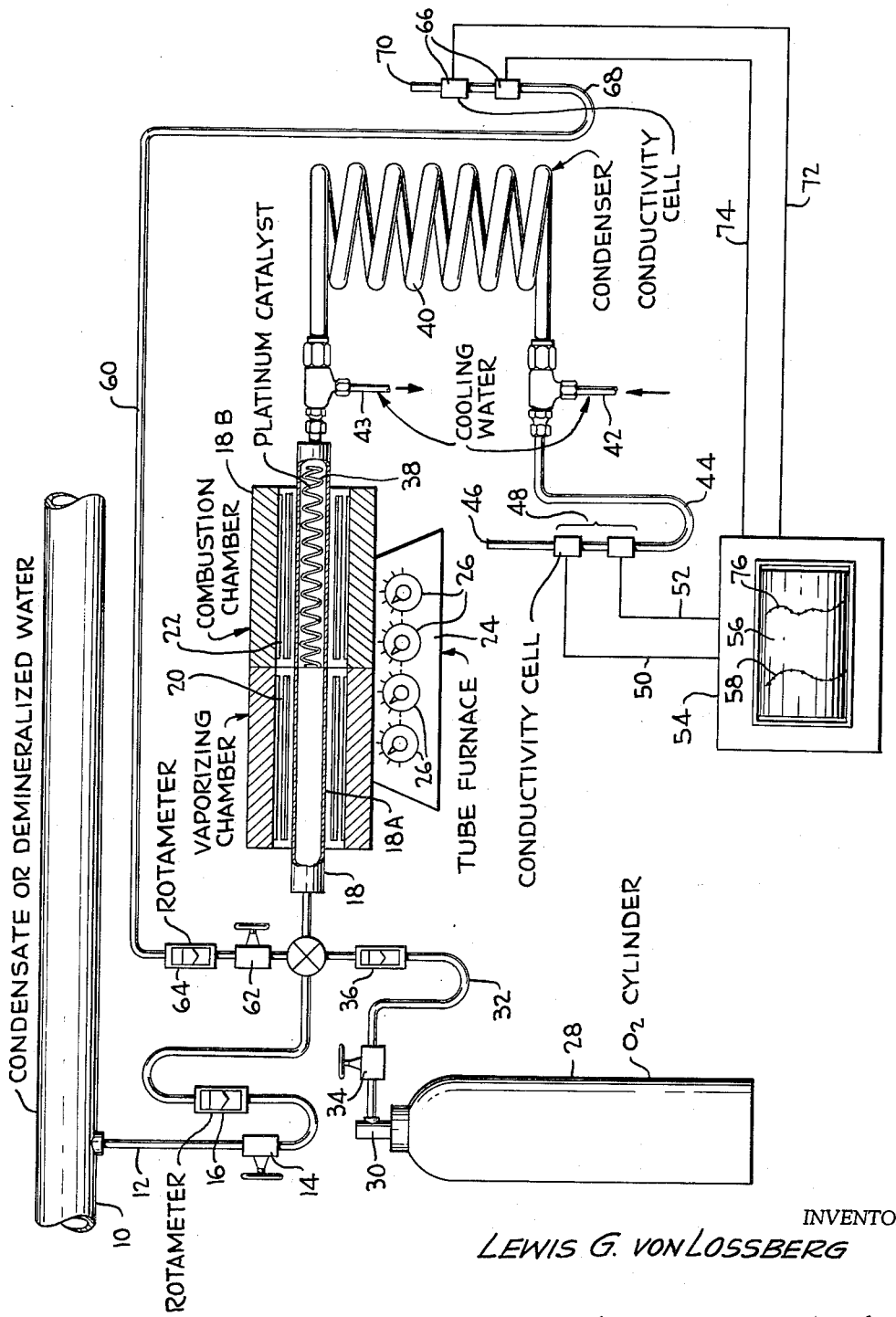
INVENTOR,
LEWIS G. VON LOSSBERG
BY Watson, Cole, Grindle & Watson
ATTORNEYS

United States Patent Office 3,205,045
Patented Sept. 7, 1965

3,205,045
APPARATUS FOR CONTINUOUS MEASUREMENT OF ORGANIC MATTER IN WATER
Lewis G. von Lossberg, Baltimore, Md., assignor to Sheppard T. Powell, Baltimore, Md.
Filed Sept. 6, 1962, Ser. No. 221,780
3 Claims. (Cl. 23—253)

This invention relates to a method and an apparatus for continuously measuring the organic contaminants in a flowing stream of water.

The invention is especially adapted for use in the measurements of organic contaminants in substantially mineral-free water such as condensate or demineralized water, though by slight modification it is adaptable also for use with raw or partial treated water.

It has been found that organic contamination of condensate and the demineralized water may result and frequently does result from various causes such as process leaks, improper cross connections, vapor contamination, heat exchanger leaks, etc. Also, for example, demineralized water produced from surface sources generally contains organic traces due to the fact that most pretreatment is not capable of completely removing organic constituents at all times. Also, for instance, organic contamination can be carried by steam generated by boilers having organic constituents entering the steam water cycle.

Organic matter present in otherwise highly pure water used in manufacturing processes is frequently highly undesirable as it may result in damage for instance to textiles, chemicals, pharmaceuticals and certain foods undergoing processing.

Until the present time it has been customary to determine the existence of organic matter in the water by taking spot samples and subjecting these to chemical tests during which the organic constituents are oxidized by various chemical reagents. However, such testing techniques are time consuming and further their utility is extremely limited due to the difficulty of co-relating the contamination and the counteracting or quality control measures.

With these considerations in mind it is a primary object of the invention to provide a continuous method for measuring the organic contaminants in a flowing stream of water whereby to make possible the co-relating of the quality control measures with the degree of contamination present at a given time within the stream.

Further, more detailed objects are to provide for detection of contamination almost immediately with its occurrence, measurement of the degree of contamination and also for recording of its duration.

In accordance with the invention a comparatively small proportion of the flow of the main stream or flowing supply is diverted into a separate flow path to provide a flowing test sample. This sample is continuously vaporized within an enclosed portion of its flow path and pure gaseous oxygen is continuously delivered into it and combined with it, following which at a later stage in its flow path the sample stream is condensed, the resulting condensate containing dissolved carbon dioxide in proportion to the amount of organic contaminants plus such inorganic salts as may have existed in the main stream. Where the main stream is of a mineral free nature the resulting amounts of carbon dioxide in the condensate will constitute a measure of organic contamination. Similarly if the flowing test sample is made mineral free as by being passed through an ion exchange bed to remove the interfering inorganic salts, the same result will follow.

In the event the flowing sample itself consists of raw or only partially treated water, the process still may be carried out to secure an accurate indication of organic impurities by taking parallel samples of the main stream, one of which consists of the test sampler earlier mentioned, while the other consists of a monitoring sample. In the monitoring sample, the amount of carbon dioxide present is constantly measured, without first subjecting said sample to the vaporizing and oxidizing steps. It will be apparent that the difference in the amount of carbon dioxide in the two samples at any given time will indicate the amount of organic matter present.

Although the present application specifically illustrates and describes but a single means or mode of measuring the amount of carbon dioxide present in the test sample by measurement of the electrical conductivity it is contemplated that the amount of organic impurities present may also be continuously measured by various other known expedients, as for instance through coulombmetric measurement, automatic titration and colorimetric techniques.

It is similarly contemplated that the measurement of the organic matter will be continuously recorded preferably being plotted in graph form over a given period of time whereby to record the degree of contamination and the duration thereof over any given period of time, thus facilitating the carrying out of continuous counteracting measures.

Further objects and features of the invention will be apparent from the following description taken in conjunction with the accompanying drawing in which the figure illustrates a diagrammatic representation of a preferred form of apparatus for carrying out the process of the invention.

To promote an understanding of the invention reference will now be made to the preferred embodiment illustrated in the drawing and specific language will be used describe same. It is nevertheless to be understood that no limitation of the scope of the invention is thereby intended and that such further modifications and alterations are contemplated as would normally occur to one skilled in the art to which the present inventon relates.

Referring now in detail to the accompanying drawing the numeral 10 therein designates a conduit through which flows the main stream of water to be tested. A sampling pipe 12 communicates with conduit 10 and is adapted to constantly draw off or divert from the main stream a relatively small proportion of flowing sample of the main stream. This sample then moves as a continuous flowing stream through the separate and enclosed flow path which includes the conduit 12.

For controlling the rate of flow of this sample stream there may be provided a conventional valve 14. There may also be provided a conventional rotameter 16 interposed in the pipe 12 for providing an indication of the flow rate.

The pipe 12 communicates with and discharges into one end of a metal tube 18 which extends through a suitable heating means such as the heating compartments 20 and 22 of a conventional electric tube furnace 24. The furnace is provided with usual rotary control knobs 26 for selectively controlling the heat applied to different portions of the tube 18.

Pure oxygen from a suitable source such as the pressure storage cylinder 28 is metered into the flowing sample stream and thus into the tube 18 through the usual reducing valve 30 and conduit 32. Interposed within this conduit are the flow control valve 34 and rotameter 36 so that by adjustment of the valve 34 the rate of flow of the oxygen may be readily adjusted while the flow rate may be observed by virtue of the rotameter 36.

During its passage through the first portion or vaporizing chamber 18A of the tube 18, the flowing water sample with its injected oxygen is progressively heated so that it will be substantially completely vaporized as it progresses into the second portion or combustion chamber 18B. Within the combustion chamber 18B the heated mixture of water vapor and oxygen is subjected to the action of a suitable catalyst such as the platinum element 38, which causes an oxidation to occur in which the oxygen combines with any organic matter in the vapor with resulting formation of carbon dioxide in amounts which will be proportionate to the amount of oxidized impurities.

The treated vapor upon being discharged from the combustion chamber 18B is then led into and through a condenser 40, the intake end of which is coupled to the discharge end of the tube 18. Preferably the condenser 40 is of the type in which cooling water is passed in a reverse flow direction through a cooling tube disposed concentrically within the condenser tube and having inlet and outlet portions 42 and 43 respectively. In passing through the condenser 40 the treated vapor will be condensed and such carbon dioxide as is contained therein will be dissolved in the condensed water. Thus the amount of carbon dioxide in the water will constitute an accurate measure of the inorganic impurities.

The invention further consists in the step of measuring the amounts of these impurities continuously without interrupting the flow of the sample stream and preferably of also continuously recording these varying measurements. While, as earlier mentioned, various types of apparatus operating on varying principles may be readily adapted for this use by those skilled in the art, I prefer to utilize for this purpose a conventional conductivity cell coupled to a continuous recording device.

The cell thus is illustrated as applied to the U-shaped trap 44, one leg of which communicates at its upper end with the condenser to receive the discharge therefrom. The condensed water thus accumulates in both legs of the trap 44 and together with any free or uncombined oxygen is discharged through the upwardly opening outlet end 46 of the trap.

On one leg of the U-shaped trap 44 is operatively supported the conductivity cell 48 which may be of the conventional type having spaced electrodes disposed in the water within said leg. The leads 50 and 52 from the cell are connected in circuit with a conventional recording meter 54 of known type which continuously measures and records the conductivity on chart 56, the conductivity preferably being plotted as one of the co-ordinates of a graph 58 in which the other co-ordinate is in terms of time, so that the degree and duration of the contamination will be continuously recorded.

Since the conductivity will constitute a measure of the amount of carbon dioxide within the condensate, measurement of the amount of carbon dioxide as recorded at 58 will provide accurate and continuous information as to the proportions of organic contaminants, if any, present in the main stream from which the flowing sample is diverted in the event the main stream itself is mineral free. Alternatively, in the event the flowing stream is not mineral free the flowing test sample alone may be demineralized as by being passed through a suitable ion exchange bed (not shown) prior to the oxidizing step.

The process and apparatus as thus far described will thus suffice for testing water from which the inorganic ions have been removed. However, the invention lends itself also to use with raw or only partially processed water in which case, in addition to the demineralized flowing test sample heretofore mentioned, there is also simultaneously taken a demineralized parallel flowing monitoring sample from the main stream. The conductivity of the water in the monitoring sample is measured and recorded simultaneously with that of the test stream. The differences in conductivity at any given time between the two streams will thus furnish an accurate indication of the amount of organic impurities present in the sample stream diverted through the tube or conduit 12.

Thus as is illustrated in the drawing, the monitoring sample is taken off through the pipe 60 under control of a valve 62 at substantially the same rate of flow as the test sample flowing through pipe 12. A rotameter 64 in pipe 60, together with the rotameter 36 in the test sample pipe 12 provides means for comparison of the relative rates of flow in the two diverted streams. Substantial equivalency of these flow rates may be obtained in obvious manner through adjustment of the valves 34 and 62. The valve 62 also provides a means for discontinuing the use of the monitoring stream within the pipe 60 when its use is not desired. Demineralization of both samples may be readily accomplished by a conventional ion exchange unit interposed in conduit 12.

A conductivity cell 66 similar to the cell 48, earlier described, is disposed on one leg of the U-shaped trap 68 which leg is open at its upper end 70 to permit free flow of the water. Cell 66 also may have its leads 72 and 74, respectively, operatively connected to the conductivity meter recorder 54. As indicated, this meter may be of the dual type arranged to continuously record conductivity graphically at 76 on the chart 56 for comparison with the simultaneously recorded conductivity graph 58 of the test sample.

It will thus be readily apparent that the process and apparatus herein disclosed provide for continuous measurement and recording of organic contaminants in water, and it will be further obvious that such measurement can be made, by appropriate calibration of the measuring and recording means, to accurately represent the proportionate amount of contaminants in the sample stream at a given time. For instance, it is believed to be apparent that the conductivity meter-recorder is adaptable in known manner to measure and record the degree of contamination in parts per million or even in parts per billion. Further it will be readily apparent that the process and apparatus of the invention are readily adaptable for use with water containing interfering inorganic materials by using a parallel testing or monitoring system as above described.

Having thus described my invention I claim:

1. Apparatus for continuously measuring the organic content of a flowing stream of water, comprising means defining a separate flow path communicating with said main stream for continuously diverting a small porportion of the flow of said main stream, a source of oxygen, and means for delivering said oxygen into the water in said flow path, means defining vaporizing and combustion chambers comprising part of said flow path for reception of said water and oxygen and vaporization of the water, and for causing said oxygen to combine with organic impurities in said water, a condenser communicating with and receiving the combustion products from said combustion chamber, and means communicating with the condenser for continuously receiving and measuring the proportionate amount of carbon dioxide in the condensate.

2. Apparatus as defined in claim 1, in which said last mentioned means comprises a conductivity cell.

3. Apparatus as defined in claim 2 including a further conductivity cell arranged to measure the conductivity of the water of said main stream, and means for continuously and simultaneously recording the readings of both said conductivity cells.

References Cited by the Examiner
UNITED STATES PATENTS

| | | |
|---|---|---|
| 1,333,850 | 3/20 | Kennedy. |
| 1,515,237 | 11/24 | Yensen. |
| 1,560,660 | 11/25 | Cain. |
| 2,046,583 | 7/36 | Rummel _____ 23—230 |
| 3,001,917 | 9/61 | Scheirer _____ 23—232 X |

MORRIS O. WOLK, *Primary Examiner.*

JAMES H. TAYMAN, JR., *Examiner.*